United States Patent [19]

Frueh

[11] 4,364,458
[45] Dec. 21, 1982

[54] BRAKE RELEASE AUTOMOTIVE FUEL CONTROL ASSEMBLY

[76] Inventor: John J. Frueh, 806 W. 167th St., Gardena, Calif. 90247

[21] Appl. No.: 312,833

[22] Filed: Oct. 19, 1981

[51] Int. Cl.³ .............................................. B60K 41/20
[52] U.S. Cl. ................................... 192/3 T; 192/3 M
[58] Field of Search .......................... 192/3 T, 3 M, 1; 74/527

[56] References Cited

U.S. PATENT DOCUMENTS

| | | | |
|---|---|---|---|
| 2,853,164 | 9/1958 | Sturdy | 192/3 T |
| 3,168,933 | 2/1965 | Thorner | 192/3T X |
| 3,168,943 | 2/1965 | Thorner | 192/3 T |
| 3,820,639 | 6/1974 | Frueh | 192/3 T |

Primary Examiner—George H. Krizmanich
Attorney, Agent, or Firm—Howard L. Johnson

[57] ABSTRACT

Entirely mechanical assembly attachable to accelerator pedal of motor vehicle for selective setting of fuel flow. Chosen setting can be instantly overridden by pedal depression or be completely cancelled by tapping brake pedal. Set position is determined by longitudinal series of transverse slots on lengthwise-reciprocable control shaft, which slots are engagable by unidirectional latch; latter is disengaged by small rotation of shaft to bring smooth surface of shaft to sliding registration with latch. Cable connection between brake pedal and control shaft converts vertical movement of pedal to rotational movement of shaft.

5 Claims, 7 Drawing Figures

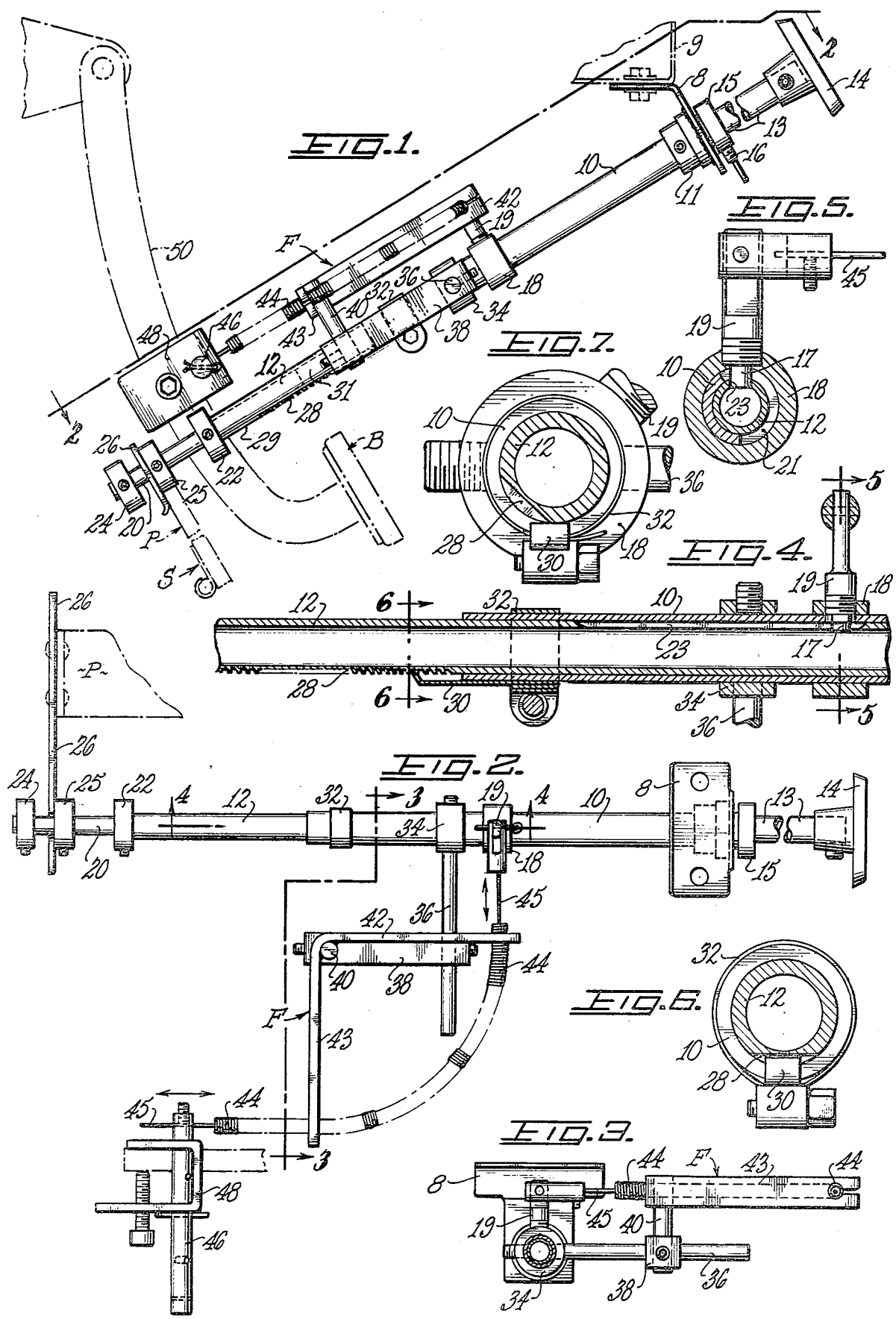

BRAKE RELEASE AUTOMOTIVE FUEL CONTROL ASSEMBLY

BACKGROUND OF THE INVENTION

Many efforts have been made to provide an automotive control means which would either make possible a constant speed or a constant fuel flow to a vehicle motor. For the former, a computer can be connected to the motor which varies the rate of fuel so as to obtain a constant speed. However, to obtain a constant fuel flow, which is particularly desirable for driving long stretches, various devices have been devised to hold the operator's fuel pedal at a chosen setting. These have turned out to be fairly complicated, many of them depending on electrical magnetic elements. For example, in my earlier U.S. Pat. No. 3,820,639, such a throttle holder employed a magnetic element and the assembly had to be installed on both sides of the fire wall of the vehicle. In contrast, the present construction provides a simple mechanical assembly which can be readily installed in the operator's compartment of a vehicle, and easily removed and installed in another vehicle if desired.

BRIEF DESCRIPTION OF THE INVENTION

The invention provides a generally upstanding (slanted) operating shaft attachable at its lower or distant end, by a telescopically extensible coupling, to the fuel control pedal (accelerator) of a motor vehicle. The shaft is longitudinally movable within a shorter housing tube or channel, the longer shaft projecting from each end thereof and also being (at least partially) axially rotatable therein so as thus to arcuately shift a unidirectional latch (which is carried by the housing channel) between latched and unlatched positions along the shaft. For such positioning, a longitudinal strip of the shaft bears a series of transverse slots or sockets which are selectively engageable by the latch, thereby restraining the shaft against "upward" or proximate movement within the channel, but permitting further ratchet-like extension toward the distant or accelerator end. The extent of "downward" extension of the shaft at which it is latched, thus becomes the minimum fuel flow setting for the accelerator. The latter can be pushed further if needed; thereafter it returns to the set position by the telescopic coupling which is received in the lower, tubular end of the shaft.

Laterally adjacent to the socketed strip, the shaft is smooth surfaced, so that positioning the latch overlying this strip leaves it free for sliding engagement in either direction; in other words, the shaft is unlatched merely by small turning of the shaft. Such unlatching can be effected merely by tapping the brake pedal which is cable-connected to the shaft in a manner which transforms vertical movement of the brake pedal to transverse torsion of the shaft.

In its simplest form, the heart of the assembly can be regarded as three telescopically disposed sleeves: (a) an accelerator-coupling stem slidable within the distant end of (b) a tubular operating shaft which is lengthwise and rotationally journalled intermediate its ends by (c) a stationary housing tube or guide channel.

BRIEF DESCRIPTION OF THE DRAWINGS

FIG. 1 is a side elevational view of the present assembly as installed in the driver's compartment of a motor vehicle, with the accelerator (fuel supply) pedal and the laterally adjacent brake pedal each shown in phantom.

FIG. 2 is an inclined top view as seen along line 2—2 FIG. 1.

FIG. 3 is a transverse section taken on line 3—3 of FIG. 2.

FIG. 4 is an axial section taken through an intermediate length of the assembly along line 4—4 of FIG. 2.

FIG. 5 is a transverse section along line 5—5 of FIG. 4.

FIG. 6 is a transverse section along line 6—6 of FIG. 4.

FIG. 7 is similar to FIG. 6 with the slotted shaft turned to unlatched position.

DETAILED DESCRIPTION OF PREFERRED EMBODIMENT

By means of a mounting bracket or hanger 8 fastened to the dashboard of the operator's cab 9, a cylindrical housing tube or guide channel 10 is fixed in forward-declining position, with its distant end pointed to one side of the fuel accelerator pedal P on the floor of the cab and its proximate end secured by a mounting collar 11. Axially rotatable and also longitudinally displaceable within the channel 10, as well as projecting beyond each end thereof, is a somewhat longer, cylindrical, tubular shaft 12 which serves as the main operating or control element. The top or upward projecting, proximate length 13 of the shaft 12 terminally carries a manual operating knob 14 at a proximate hand-reach position, plus a positioning collar 15 which when loose is slidable lengthwise to the shaft 13. The collar can be anchored by a manually set screw 16 so that abutment of the collar with the hanger 8 thus determines the limit that the shaft 12-13 can then be slid downward within the channel. In use, such setting can be effected after the distant fuel control element or accelerator pedal P has been depressed to a selected fuel-flow position which it is desired to maintain. That is, if the shaft 12-13 is subsequently moved upward in the channel 10 by release of the pedal P, subsequent down movement of the shaft 12-13 will take it only as far as the holding position set by the now anchored collar 15.

A diametrically diminished stem 20 is telescopically received within the distant or lower length 29 of the control shaft 12, carrying a shaft abutment collar 22 which thus limits extent of entry into the tubular length 29. Distantly the stem carries a pair of collars 24, 25 axially spaced apart so as to loosely receive between them, an edge-slotted transverse plate 26 which extends laterally from its attachment to the peripheral or outer end of the fuel accelerator pedal P.

Along a lower, exposed length of the control shaft 12, a pattern is formed of latch-engagement means 28 (FIG. 4) consisting of a lengthwise strip of transverse or chordal steps or slots, each having one radial face (engageable by a latch) and an opposite angular or slanted face (which an angular latch can easily slide over in one direction only). Such a slanted or unidirectional latch 30 is attached lengthwise to the channel 10 by a collar 32, spring-tensioned to engagement position. The shaft 12 is thus held, when latched, against upward movement; but it can be slid down (manually) to be engaged at a lower latch position. Disengagement is effected simply by turning the shaft 12 a small amount so as to bring the latch to an adjacent smooth length 31 of the shaft, where the latch can slide unrestrained whichever direction the shaft moves along its length.

An intermediate length of the guide channel 10 carries a partially-rotatable operating collar 18 fixed to a radially upstanding post 19. The latter projects a pintle 17 across an arcuate slot 21 which is formed in the channel 10, the pintle extending into a lengthwise groove 23 of the rotatable shaft 12. Accordingly, by movement of the post 19, the shaft 12 by the connected pintle 17 can be turned by the length of the slot 21 and thus shift the latch 30 between engagement and disengagement with the slots 28.

Such unlatching of the control shaft 12 can be effected (regardless of the location of the pintle 17 along the groove 23) by tapping the vehicle brake pedal B which is connected to the post 19 by a pull wire 45. The usual foot operated brake lever B of an automobile is generally disposed parallel to the accelerator foot pedal P. Hence directional (down) movement of the brake pedal B, if it is to be transmitted to the present control shaft 12, must be changed 90° directionally so as to exert a transverse or turning force on the latched shaft 12. As just described, such rotation of the shaft 12 disengages the latch 30 from the strip of cross slots 28.

For this purpose, a collar 34 secures to the guide channel 10 a radially projecting support arm 36. The arm carries a spar 38 which supports an upstanding pin 40 which locates a right-angle frame F. The respective arms 42, 43 of the frame hold the corresponding ends of a tubular sheath or arcuate cable 44 which carries the intermediate length of a lengthwise reciprocable, pull wire 45 (sometimes called a Bowden wire). One end of the wire 45 is secured to the post 19, the other end to a U-clamp 48 (FIG. 2) which is attached to the lever arm 50 of the brake pedal B. Thus merely tapping the brake pedal B (as with the operator's foot) draws the taut wire 45 lengthwise through the semi-flexible sheath 44 so as to turn the shaft 12 through a small arc and thus disengage the latch 30 from its slot 28 by bringing a smooth stretch of shaft 31 beneath the latch 30. Functional realignment of the slots 28 and latch 30 is automatically restored by reverse lengthwise movement of the taut pull wire 45, when the brake is released; thus the shaft 13 is turned back by a similar arc so as to restore engagement of the latch 30 with the strip of slots 28.

The assembly also provides an adjustment slide pin 46 (FIG. 2) along which the U-clamp 48 can be located in order to accommodate different spacing between brake and accelerator pedals in various motor vehicles. The limited flexibility of the cable 44 also allows for such variation between vehicle models.

SUMMARY

At the start, the shaft-positioning collar 15 may be loose to allow its movement along the upper or proximate, projecting segment 13 of the control shaft 12; on the road, the driver depresses the accelerator pedal P to an operating position where a constant fuel flow (and vehicle speed) results. The shaft 12-13 is then manually pushed down to this position (that the end 29 of the shaft abuts the collar 22) and the screw 16 is tightened when the collar 15 is against the hanger 8. The shaft 12 is then held at this position of constant fuel flow by the latch 30 engaging one of the slots 28. If greater fuel flow is desired temporarily, the accelerator P is depressed further, as accommodated by the telescopic stem 20, the latter returning to previous position upon pedal release.

If it is desired to set the control shaft 12 for a greater fuel flow, the pedal P is held at such position while the collar 15 is loosened, the shaft 12-13 slid further down (manually) and the collar 15 retightened against the hanger 8.

For an immediate disengagement of the latch setting, the brake B is tapped which causes the wire 45 to pull the post 19 which turns the shaft 12 so that the latch 30 now overlies the smooth length 31 of the shaft, allowing the spring loaded pedal P (held down by the shaft 12) and the shaft 12, to return to the idling position. Release of the brake will then cause the wire 45 to push the post 19 and turn the shaft 12, back to the latch engagement position.

It will be appreciated that the collar 15 need not be fastened (indeed may be omitted) if it is not desired to stop the control shaft at a desired advanced position.

I claim:

1. A fuel control assembly comprising in combination:

an elongated guide channel having a proximate end and a distant end, and means for mounting said channel in the operator's compartment of a motor vehicle between a distant fuel control element and a proximate hand-reach position for a vehicle operator, an operating shaft movable lengthwise along said guide channel, having proximate and distant lengths extending beyond the respective ends of the guide channel, said shaft being at least partially rotatable axially along the channel and bearing a longitudinal series of engagement means located laterally-adjacent a smooth length of said shaft, unidirectional latch means carried by the guide channel and positionable by such rotation of the shaft to engage a selected unit of said engagement means and thereby restrain lengthwise movement of the shaft toward its proximate end only, and alternately by counterrotation of the shaft to slidingly overlie said smooth length of the shaft and thereby permit lengthwise shaft movement in either direction, unrestrained by the latch means, means for coupling the distant length of said shaft with said fuel control element to maintain a set level of fuel flow responsive to the amount of distant extension of the shaft from the guide channel, and means for releasably setting the distant end of said shaft at a selected amount of extension from said guide channel, thereby holding the coupled fuel supply element in position to effect corresponding fuel flow.

2. An assembly according to claim 1 which includes means responsive to movement of a brake pedal of the compartment of said motor vehicle, for shifting said latch means from engagement with the engagement means to the adjacent smooth length of said operating shaft by partial rotation of the shaft, which brake responsive means comprise a taut, longitudinally movable wire having its ends secured respectively to said brake pedal and to said shaft, and having an intermediate length longitudinally movable within a flexible, generally arcuate sheath fixedly disposed between the brake pedal and the shaft.

3. An assembly according to claim 1 wherein the coupling means of said fuel supply element include telescopic means attachable lengthwise to the distant end of said operating shaft, whereby the fuel supply element may be moved directly by an operator to temporarily override and increase said set level of fuel flow without extending said shaft.

4. An assembly according to claim 3 which includes a shaft-positioning collar displaceable lengthwise along the proximate length of said shaft, having means for selected anchorage therealong, and disposable when so anchored, in abutment with the proximate end of the guide channel, thereby to hold the shaft against displacement toward the distant end of the channel while permitting its retraction from the proximate end and subsequent return to such abutment position.

5. A fuel control assembly comprising in combination:

an elongated guide channel having a proximate end and a distant end, and means for mounting said channel in the operator's compartment of a motor vehicle between a distant fuel control element and a proximate hand-reach position for a vehicle operator, an operating shaft movable lengthwise along said guide channel, having proximate and distant lengths extending beyond the respective ends of the guide channel, said shaft being at least partially rotatable axially along the channel and bearing a longitudinal series of engagement means located laterally-adjacent a smooth length of said shaft, unidirectional latch means carried by the guide channel and positionable by rotation of the shaft to engage a selected unit of said engagement means and thereby restrain lengthwise movement of the shaft toward its proximate end only, and alternately by counterrotation of the shaft to slidingly overlie said smooth length of the shaft and thereby permit lengthwise shaft movement in either direction, unrestrained by the latch means, means for coupling the distant length of said shaft to said fuel control element to maintain a set level of fuel flow responsive to the amount of distant extension of the shaft from the guide channel, including telescopic means permitting reciprocable movement of the coupled fuel control element beyond said set position so as to temporarily override the same, the proximate length of said operating shaft carrying a collar displaceable therealong between the respective proximate ends of the shaft and of the guide channel and being selectively anchorable therealong, thereby determining the amount of extension of said distant length from the guide channel and setting a selected level of fuel flow, and means responsive to movement of a brake pedal in said operator's compartment, for disengaging said latch means by counterrotation of said shaft, said disengaging means comprising a curved longitudinally movable wire having its respective ends secured to said brake pedal and to said shaft, and having an intermediate length disposed within a flexible, arcuate sheath extending between the brake pedal and the shaft.

* * * * *